United States Patent [19]
Plickert et al.

[11] Patent Number: 5,940,550
[45] Date of Patent: Aug. 17, 1999

[54] ELECTROOPTICAL MODULE

[75] Inventors: Volker Plickert, Brieselang; Ralf Carl, Berlin; Barbara Lehner, München, all of Germany

[73] Assignee: Siemens Aktiengesellschaft, Munich, Germany

[21] Appl. No.: 09/047,165

[22] Filed: Mar. 23, 1998

[30] Foreign Application Priority Data

Mar. 21, 1997 [DE] Germany .............................. 197 14 170

[51] Int. Cl.⁶ ...................................................... G02B 6/26
[52] U.S. Cl. ................................... 385/15; 385/9; 385/88; 385/14
[58] Field of Search .................................. 385/88–94, 15, 385/14, 1–9; 257/82

[56] References Cited

U.S. PATENT DOCUMENTS 4,122,479  10/1978  Sugawara et al. .......................... 257/82
5,566,264  10/1996  Kuke et al. ................................. 385/49

FOREIGN PATENT DOCUMENTS

0466975A1  1/1992  European Pat. Off. .
4323828A1  1/1995  Germany .

*Primary Examiner*—Phan T. H. Palmer
*Attorney, Agent, or Firm*—Herbert L. Lerner; Laurence A. Greenberg

[57] ABSTRACT

An electrooptical module includes a converter and at least one optical wave guide having an end optically coupled to the converter through a coupling gap. The coupling gap is filled with a first light-permeable material. A second light-impermeable material protects an electrical circuit disposed in the immediate vicinity of the converter from outside light. The second material is equivalent in its basic chemical composition to the first material, but is modified in its optical properties for the sake of impermeability to light. At least one bonding wire serving to trigger the converter passes through the first and second materials.

5 Claims, 1 Drawing Sheet

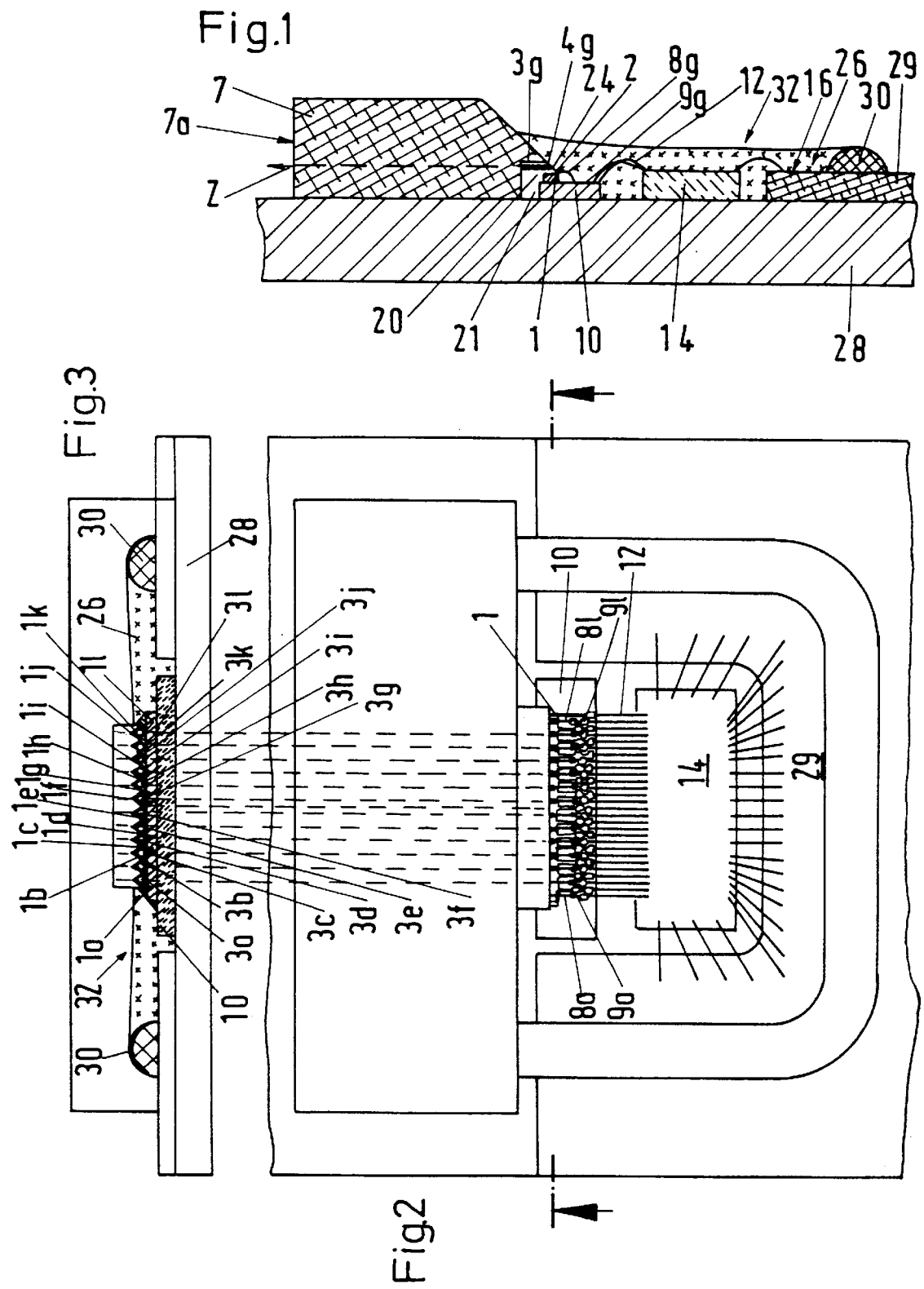

ELECTROOPTICAL MODULE

BACKGROUND OF THE INVENTION

Field of the Invention

The invention relates in particular to the filed of multi-channel electrooptical data transmission connections and pertains to an electrooptical module with at least one electrooptical converter.

Within the scope of the present invention, the term "electrooptical converter" is understood to mean both a transmitting and a receiving element (such as light-emitting diodes, surface-emitting laser diodes, or photodiodes). The optically active surface region or regions of the converter, that is light-emitting zones for a transmitter and light-sensitive zones for a receiver, will be referred to below by the general term "optically active zones".

An especially critical region in module construction in terms of the capacity and coupling efficiency of a module is a coupling point between the converter and an injection region of an optical fiber (optical waveguide) serving the purpose of guiding light. In the case of multichannel modules, a number of coupling points corresponding to the number of channels is necessary. In principle, such coupling regions must be protected against external influences, and in particular against condensing moisture from the air and temperature changes, for example.

One protection possibility employed heretofore is a hermetically sealed encapsulation of the module in a comparatively complex and expensive hermetic housing. In an individual encapsulation of the coupling gap, that is known in principle, for instance, from Published European Patent Application 0 466 975 A1 or German Published, Non-Prosecuted Patent Application DE 43 23 828 A1, which uses a covering or casting composition, considerable problems arise because of component geometry and component length, especially in multichannel modules with converters having a plurality of optically active zones. That occurs as a consequence of different thermal expansion behaviors of the individual components, especially the converter and the optical wave guide array to be coupled. Another problem area in multichannel high-power modules is that for triggering the converters (transmitters) or further processing of the converter signals (receivers), the integrated electrical circuits which are required for that purpose, if high operating frequencies are to be achieved, should be disposed as much as possible in the immediate vicinity of the converter components and connected with short bonding wires. The integrated electrical circuits which are used for that purpose as a rule are light-sensitive and must therefore be protected against the entry of outside light or against being exposed to stray light from the converter.

No satisfactory overall solution has been disclosed heretofore for those complex and specific protection requirements of the coupling gap on one hand and of the electrical circuit on the other hand within the smallest possible space. In protection materials that differ in composition or structure and are optimized in terms of their optical properties, it proves to be problematic to lead the bonding wires through, because of the different thermal properties of the materials.

SUMMARY OF THE INVENTION

It is accordingly an object of the invention to provide an electrooptical module, in particular a multichannel module, which overcomes the hereinafore-mentioned disadvantages of the heretofore-known devices of this general type, which provides reliable protection of both coupling gaps between an optically active zone or zones and associated ends of optical wave guides, which is simple to produce and which can be operated even at high frequencies, because a converter and an electrical circuit associated therewith are disposed in the smallest possible space.

With the foregoing and other objects in view there is provided, in accordance with the invention, a n electrooptical module, comprising an electrooptical converter having at least one optically active zone; an optical wave guide having an end optically coupled to the at least one optically active zone, forming a coupling gap; a light-sensitive integrated electrical circuit disposed in the vicinity of the converter; wire bonds electrically connecting the electrical circuit to the converter; a first material permeable to converter-specific light, the first material filling the coupling gap; a second material surrounding the electrical circuit, having a basic composition corresponding to the first material and having optical properties modified to make it impermeable to light influencing the circuit; the first and second materials having a common boundary surface; and at least one bonding wire penetrating the common boundary surface.

One substantial advantage of the invention is that by using materials that are equivalent in their basic (chemical and structural) composition, identical and homogeneous mechanical properties are assured, thus reliably avoiding strains from thermal effects on the components involved and in particular on the bonding wires. Moreover, only a single type of material has to be processed and mastered in terms of its application by using materials of chemically identical makeup for the first and second (casting) materials. The modification, to be provided according to the invention, of the optical properties of the second material can be carried out, for instance, by admixing suitable light-shielding and/or light-absorbing particles (such as soot, pigments, dyes, graphite, $Al_2O_3$, $CaCO_3$, talc, $TiO_2$, silicates, pyrogenic silicic acid). It is also conceivable to stain the second material with substances which are impermeable, at least in the wavelength range of the light that is incident in operation and possibly entering from outside. The boundary surface between the first and second materials advantageously permits a complete inclusion, and therefore protection of the bonding wire, passing through the boundary surface.

In accordance with another feature of the invention, the optical wave guide end surface is located in the plane of the boundary surface. This is a feature of the module of the invention that is preferred from a production standpoint. In such a structural layout, the materials which are usually usable can be applied especially precisely and in especially appropriate doses.

In accordance with a further feature of the invention, the coupling gap is filled with a polymer which has an especially low glass transition temperature and is optically transparent for the operative wavelength range. Silicones are especially suitable for this purpose since even at extreme alternating temperature stresses, they are highly reliable without exhibiting any worsening in their transmission performance. The low viscosity of silicone and its flowability permit reliable, targeted filling of the coupling gap.

In accordance with a concomitant feature of the invention, the second material is applied over a base plate supporting the circuit, in a region which is defined at least partly by a casting bead applied previously to the base plate. This is a feature of the invention that is especially preferred from a production standpoint.

Other features which are considered as characteristic for the invention are set forth in the appended claims.

Although the invention is illustrated and described herein as embodied in an electrooptical module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 1–3 are respective fragmentary, diagrammatic, longitudinal-sectional, plan and cross-sectional views of a module according to the invention.

DESCRIPTION OF THE PREFERRED EMBODIMENTS

Referring now in detail to the figures of the drawings as a whole, there is seen a module including an electrooptical converter 1 with many optically active zones 1a-1l (converter array). In the present example, it is assumed that the converter is a transmission element. The optically active zones are each assigned one end of a respective optical wave guide 3a-3l through a coupling gap 2. An end of a respective optical wave guide is coupled to an associated optically active zone in such a way that upon triggering, light signals emitted by the zone travel along a light signal path, pass through a jacket surface of the optical wave guide and are reflected by its obliquely polished, mirrored end surface (such as 4g in FIG. 1) in a longitudinal axis direction Z of the optical wave guide 3g. The optical wave guide ends are disposed axially parallel in a coupling element 7 and terminate, for further coupling, at a back end surface 7a of the coupling element. The electrooptical converter is connected through many first bonding wires 8a-8l to conductor tracks 9a-9l of a converter substrate 10. The converter substrate 10 has further bonding wire terminals which are contacted with further bonding wires 12. The further bonding wires 12 connect a light-sensitive, integrated electrical trigger circuit 14 with the electrooptical converter 1 in such a way that the active zones can be activated individually in accordance with output signals of the trigger circuit and thus can be excited individually for targeted emission of light. Further contacting points for the electrical circuit are provided to the rear, by way of which this circuit is connected through the use of further bonding wires to conductor track terminals 16 for the sake of external contacting of the module.

A first material 20 which is permeable to light emitted by the optically active zones 1a-1l fills up the coupling gap 2 and a space 21 located behind it. The first material ends at a boundary surface 24, which encloses the mirrored optical wave guide end surface 4g shown in FIG. 1. A second material 26 surrounds the electrical circuit 14 and is equivalent in its basic chemical composition to the first material 20. The materials are formed of silicone resins, such as polymethyl or polymethylphenyl siloxanes, or silicone rubber, at least in such a way that both materials 20, 26 have the same mechanical and thermal properties. In particular, both materials have the same coefficients of thermal expansion, so that bonding wires 8g passing from the first material 20 into the second material 26 by penetrating the boundary surface 24 are not exposed to different thermally induced stresses.

A printed circuit board 29 which carries the conductor track terminals 16, as well as the electrical circuit 14 and a preponderance of the converter substrate 10, are disposed on a common base plate 28 and are entirely surrounded by the second material 26. The second material 26 is modified in its optical properties by the admixture of particles (such as soot, pigments, dyes, graphite, $Al_2O_3$, $CaCO_3$, talc, $TiO_2$, silicates, pyrogenic silicic acid) in such a way that it is impermeable to light that affects the circuit.

In the production of the electrooptical module according to the invention, the coupling gap 2 between the converter array 1 and the optical wave guide ends is filled with the first material 20, which advantageously pulls itself all the way into the coupling gap 2 by capillary action. When silicone is used, its low viscosity and flowability make themselves especially advantageously felt. After the curing of the transparent first material, a casting bead 30 is applied to the base plate 28 and cured in order to further define the casting region. The casting bead 30 may preferably be formed of an epoxy resin. Next, a casting bed 32 which is thus defined by the casting bead and is defined on the end surface by the converter array, is filled up with the second material 26. The second material, which has the same chemical basis as the first material, adequately shields the vulnerable circuit, because of the light-impermeable components that are added.

We claim:

1. An electrooptical module, comprising:

an electrooptical converter having at least one optically active zone;

an optical wave guide having an end optically coupled to said at least one optically active zone, forming a coupling gap;

a light-sensitive integrated electrical circuit disposed in the vicinity of said converter;

wire bonds electrically connecting said electrical circuit to said converter;

a first material permeable to converter-specific light, said first material filling said coupling gap;

a second material surrounding said electrical circuit, having a basic composition corresponding to said first material and having optical properties modified to be impermeable to light influencing said circuit;

said first and second materials having a common boundary surface; and at least one bonding wire penetrating said common boundary surface.

2. The module according to claim 1, wherein said boundary surface is disposed in a given plane, and said end of said optical wave guide has an end surface disposed in said given plane.

3. The module according to claim 1, wherein said first and second materials are formed of a polymer.

4. The module according to claim 1, wherein said polymer is silicone.

5. The module according to claim 1, including a base plate supporting said circuit, and a casting bead applied to said base plate and at least partly defining a region, said second material applied over said base plate in said region.

* * * * *